Patented Oct. 24, 1944

2,361,185

UNITED STATES PATENT OFFICE 2,361,185

PROCESS OF MAKING ETHER COMPOUNDS

Max Engelmann, Wilmington, Del., and Josef Pikl, Glassboro, N. J., assignors to E. I. du Pont de Nemours & Company, Wilmington, Del., a corporation of Delaware No Drawing. Application December 30, 1941, Serial No. 424,904

2 Claims. (Cl. 260—404)

This application is a continuation-in-part of our co-pending application Serial No. 356,356, filed September 11, 1940 (and issued March 16, 1942 as Patent No. 2,313,741), and relates to novel organic compounds which may be designated generally as ethers of organic amido methylol compounds.

It is an object of this invention to produce novel organic derivatives of amido-methylol compounds by etherifying the OH group of the methylol radical. It is a further object of this invention to produce novel organic compounds having valuable surface-active properties. Other and further important objects of this invention will appear as the description proceeds.

We have found that methylol-amides react readily with compounds containing alcoholic hydroxyl groups according to the following reaction:

$$R-CO-N-CH_2=OH + OH-R' = R-CO-N-CH_2-O-R' + H_2O$$
$$\quad\ \, |\qquad\qquad\qquad\qquad\qquad\ \ |$$
$$\ \ \ R''\qquad\qquad\qquad\qquad\qquad\ R''$$

In this equation R is an aliphatic, aromatic, araliphatic, or cyclo-aliphatic radical, which may be attached to the CO group directly or through the agency of a non-carbonic link such as O, S or NH, and preferably contains no water-solubilizing groups, while R'' is hydrogen or an organic radical. As hydroxy compounds, to react as above with the methylol amides, one may use aliphatic or aromatic alcohols, polyhydroxy compounds, hydroxy-carboxylic acids, hydroxy-phosphonic acids, a hydroxy-alkyl-sulfonic acid or their esters, amides and other derivatives which still contain the OH group.

This application is concerned primarily with those compounds wherein R' is free from water-solubilizing groups.

As a special subgroup of our generic invention above come the ethers of the general formula

R—CO—NH—CH$_2$OR' wherein R is an aliphatic or cycloaliphatic radical containing at least 7 carbon atoms and attached to the CO group directly or through the agency of oxygen, sulfur or a nitrogen atom. If in this formula R' is selected so as to have water-soluble groups, such as the carboxy, sulfonic or phosphonic acid radical, the resulting ether compounds form valuable agents for aqueous treatment of textile fiber to endow it with water-repellent properties. On the other hand, the compounds in which R' does not possess an acidic group may likewise be used as agents for textile fiber for similar purposes, but must be applied from organic solution, for instance, alcohol, benzene or acetone, or from aqueous emulsion.

To facilitate the further dicussion of this invention, the following typical instances of methylol compounds and of hydroxyl-bearing compounds are mentioned at this point, without any intent, however, to limit our invention to these instances.

A. *Typical methylol compounds*

Methylol-stearamide:

$C_{17}H_{35}$—CONH—CH$_2$OH

Methylol amide of naphthenic acid.
Methylol amide of hydroabietic acid.
Dimethylol of distearamido-methane:

$C_{17}H_{35}$—CO—N—CH$_2$OH
$\qquad\qquad\quad\ |$
$\qquad\qquad\ \ \,$CH$_2$
$\qquad\qquad\quad\ |$
$C_{17}H_{35}$—CO—N—CH$_2$OH Octadecyl-carbamido-methanol:

$C_{18}H_{37}$—O—CO—NH—CH$_2$OH

Octadecyl-ureido-methanol:

$C_{18}H_{35}$—NH—CO—NH—CH$_2$OH

Stearyl-ureido-methanol:

$C_{17}H_{35}$—CONH—CONH—CH$_2$OH

Benzamido-methanol:

$C_6H_5$—CONH—CH$_2$OH

B. *Typical hydroxyl-bearing compounds*
*(etherifying agents)*

Methanol:

HO—CH$_3$

Ethanol.
Isopropyl alcohol.
Octyl alcohol.
Cyclohexanol.
Ethylene glycol:

HO—CH$_2$—CH$_2$OH

Benzyl alcohol:

HO—CH$_2$—C$_6$H$_5$

Glycollic acid:

HO—CH$_2$—COOH

Glycollic-acid ethyl-ester:

HO—CH$_2$—CO—OC$_2$H$_5$

It will be clear that by various combinations of the components in the two tables, numerous and varied ethers may be obtained.

The reaction between the methylol amides and the hydroxyl-group bearing compounds may be carried out by reacting the components, preferably in the presence of a catalyst. For the latter purpose, a small amount of an anhydrous, acid reacting condensing agent may be used, such as PCl$_3$, POCl$_3$, maleic anhydride, concentrated sulfuric acid, or anhydrous hydrogen chloride. If desired an inert diluent such as acetone, ethyl acetate or dioxane, may be used in carrying out this condensation. The reaction temperature may vary from about 0° to about 100° C. The reaction may be carried out by reacting one mol of the methylol amide with one mol of the hydroxy compound, but generally an excess of the hydroxy compound will be desirable in order to carry the reaction to completion as far as possible. In many cases the hydroxy compound may be used in such a quantity as to serve also as a solvent or diluent for the reaction. In many cases, the methylol compound may be replaced by the corresponding methylene halide, for instance Stearamido-methylene-chloride:

Bis-chloromethyl-distearamido-methane:

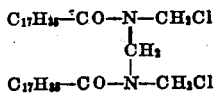

etc.

The group of products which are obtained with hydroxy compounds containing free acid groups are soluble in dilute alkaline aqueous media. Those free from water-solubilizing groups are soluble in organic media such as acetone, carbon tetrachloride, benzene, solvent naphtha, pyridine, etc. Both types are quite stable in neutral or basic media and may even be heated for a considerable length of time. They are, however, very sensitive to acids. If the sodium salt, for instance, of stearamido-methoxy-glycollic acid, $C_{17}H_{35}CO-NH-CH_2-O-CH_2-COOH$, is acidified with hydrochloric acid, the free glycollic acid is first precipitated which can be brought back into solution by addition of a base. If, however, the acidified solution is heated for a few minutes, an insoluble product is formed which cannot be dissolved again by the addition of a base.

As already mentioned, the new compounds are characterized by surface-active properties, as a result of which they may be used variously in the textile-treatment arts, for instance as softening agents, or as dye-fixing, starch-fixing or waterproofing agents. For the latter purpose, the compounds having a long alkyl chain, say over 7 carbon atoms, are of special interest. The water-repellent effect on textile fiber obtained by the aid of these compounds is of a permanent nature, in the sense that it is not destroyed by repeated washings with soap or by dry-cleaning agents.

In order to obtain this effect, the textile material is impregnated with a 1 to 2% solution of the amido-ether in an organic solvent, for instance acetone or benzene, or with an aqueous emulsion of equivalent strength, preferably in the presence of an organic-soluble or water-soluble (respectively) acid reagent, such as oxalic or acetic acid, and then subjected to a heat treatment for a few minutes at 100 to 170° C. It is believed that the decomposition products obtained by acid hydrolysis as described above are the active principles for the production of the permanent water repellent and softening effect. It is therefore desirable to add to the treatment bath a carboxylic acid, as above indicated, or any other reagent which will produce a temporary acid reaction during the baking step. Such other addition products which have been found to be effective are, for instance, ammonium chloride, pyridine hydrochloride, ammonium thiocyanate or a combination of thiourea or urea and ammonium chloride.

The novel products may also be used in combination with other waterproofing agents such as wax emulsions or in combination with other types of permanent water-repellency agents, for instance the quaternary-ammonium compounds described in U. S. Patent No. 2,146,392, or the amidomethyl-phosphonic acids of our copending application Serial No. 322,766 (Patent No. 2,304,156, issued December 8, 1942), or the various water-repellency agents of the isocyanate and ketene classes, provided these other agents mentioned are judiciously selected so as to be compatible with the particular solvent (or aqueous emulsion) employed for the treatment bath.

The new products present great advantages over other products used for imparting permanet water-repellency, for instance the quaternary pyridinium compounds of U. S. Patent No. 2,146,392, above referred to. First of all, no pyridine is needed for the preparation of our novel products, and the use of these products thus eliminates a great safety hazard and health hazard in the application. Another advantage is the much greater stability of the products which facilitates greatly the application of the products, eliminating especially the low temperature drying step imperative in the aforegoing pyridinium compounds.

Without limiting our invention to any particular procedure, the following examples are given to illustrate our preferred mode of operation. Parts mentioned are by weight.

*Example 1*

200 parts of methyl alcohol were mixed with 30 parts of methylol stearamide and stirred for a few minutes until a uniform mass was formed. One part of concentrated sulfuric acid (monohydrate) diluted with 10 parts of methyl alcohol was then added, and the mixture was heated for five hours at a temperature of 50° C. After about one hour's heating the reaction mass became clear. After cooling, the reaction product was filtered and recrystallized from methyl alcohol. The stearamidomethyl-methyl-ether has a melting point of 88 to 89° C. It is soluble in ethyl alcohol, benzene, ether, carbon-tetra-chloride, but insoluble in water.

Nitrogen analysis: Found, N=4.50%. Calculated for $C_{17}H_{35}CO.NH.CH_2OCH_3$, N=4.28%.

This product was applied to cotton fabric from an acetone solution at a strength of 1% in the presence of 1% of oxalic acid and then subjected to a baking treatment for 10 minutes at 150° C. It gave a strongly water-repellent finish which was only slightly removed by washing.

*Example 2*

100 parts of benzyl alcohol and 15 parts of stearamido-methanol were thoroughly mixed, and a mixture of 0.5 part of phosphorus-oxychloride, diluted with 10 parts of benzyl alcohol, were added. The reaction mass was heated while stirring for 2½ hours at a temperature of 60° C. After about one-half hour the mixture became clear. After cooling down to room temperature, the reaction product was filtered and recrystallized from methyl alcohol. It was found to melt at 86.5 to 87° C. It is soluble in alcohol, ether, benzene, acetone and carbon tetrachloride but insoluble in water. When heated with 50% sulfuric acid it gives the characteristic odor of benzyl alcohol. N - analysis=3.53%. The theory for $C_{17}H_{35}CO.NH.CH_2OCH_2C_6H_5$ requires $N=3.47\%$. When this product was applied to cotton cloth from a 2% solution in acetone in the presence of 1% of ammonium thiocyanate, as described in the preceding example, a strong water-repellent action was obtained.

Example 3

To 100 parts of octyl alcohol there were added 20 parts of methylol stearamide while a slow stream of hydrogen chloride was being passed into the reaction mixture at 30 to 40° C.

The methylol amide went gradually into solution, and a viscous mass was formed. After 20 minutes 500 parts of acetone were added. The mass was warmed to 45° C. and then gradually cooled until crystallization started. 23 parts of a well crystalline product was obtained which melted sharply at 81° C. The analysis of this product agreed with the hypothesis that it was the octyl ether of methylol stearamide, of the formula $$C_{17}H_{35}-CONH-CH_2-O-C_8H_{17}$$

Example 4

To 100 parts of octyl alcohol there were added 20 parts of methylol benzamide, and the mixture was then warmed to 40 to 45° C., while a slow stream of hydrogen chloride was being passed into the reaction mixture. After 30 minutes, 400 parts of ether were added to the reaction mass and the latter was then cooled with a freezing mixture to −30° C. The reaction product crystallized readily at this temperature and was filtered rapidly. It melted sharply at 48° C., and was recrystallized from a mixture of alcohol and water.

The analysis indicated that it was most probably the expected octyl ether of methylol benzamide, of the formula $$C_6H_5-CONH-CH_2-O-C_8H_{17}$$

It will be understood that many variations in the details of procedure may be practiced, without departing from the spirit of this invention.

As methylol amides one may use any of the fatty-acid methylol-amides, which may be saturated or unsaturated, straight-chain, branched chain or cyclo aliphatic, and also the methylol compounds of the corresponding alkyl or acyl ureas or carbamates, such as octadecyl-carbamate. One may also use methylol amides of aromatic or araliphatic acids, for instance the amides of naphthenic acid or hydro-abietic acid. The methylol compounds may be substituted by various substituents, except water-solubilizing groups, and may be derived from mono- or polycarboxylic acid amides. Other methylol compounds useful for this reaction may be prepared by decomposing chloromethylamides such as are disclosed in U. S. P. 2,131,362 or in copending application of M. A. T. Rogers, Serial No. 286,944 (or corresponding British Patent No. 517,474), by treatment with water or basic compounds, for instance potassium carbonate.

Furthermore, as already mentioned above, the use of methylol-amides may be dispensed with by substituting in their place the corresponding methylene-halides. Thus, chloromethyl stearamide or methylene-di(stearamidomethyl chloride) may be reacted with any of the aforegoing hydroxyl-bearing compounds, for instance methyl, octyl or benzyl alcohol or other mono- or polyhydroxy compounds, except cellulose, provided care is taken that the hydrogen halide which is formed in the reaction does not decompose the product.

This may be accomplished by reducing the reaction time to the shortest possible limit and by discouraging activity on the part of the hydrogen halide either by cooling down the reaction mass promptly after completion of the reaction, or by neutralizing the hydrogen halide formed in the reaction, or by diluting the latter to a point where its activity is very weak.

Still another way for the preparation of the novel compounds of this invention is the simultaneous reaction of a higher fatty-acid amide with formaldehyde and the selected hydroxy-compound at about 50° C., in the presence of an acid catalyst as above defined.

As for the methylol-amides employed as initial materials for this invention, these may be prepared by standard methods; for instance, by heating (to about 50 or 60° C.) the corresponding carboxylic acid amide with paraformaldehyde, or other source of formaldehyde, in an inorganic liquid medium, such as methyl or ethyl alcohol, benzene, toluene or pyridine, in the presence of an acid absorbing agent, for instance potassium carbonate, sodium carbonate or pyridine. See for instance, U. S. Patents Nos. 2,146,392 and 2,212,654.

The methylene halides employed as an alternative for our initial materials as above indicated, are generally prepared by reacting with paraformaldehyde on the corresponding carboxylic acid amides in the presence of dry hydrogen chloride. See for instance, U. S. Pat. No. 2,131,362, British Patent No. 492,699 and copending application of Rogers, Serial No. 286,944 (or corresponding British Patent No. 517,474).

We claim:

1. The process of producing novel organic compounds which comprises reacting with a hydroxyl-bearing compound of the general formula HO—R′, wherein R′ stands for a hydrocarbon radical selected from the group consisting of alkyl, cycloalkyl and aralkyl, upon an amido-methylene compound of the general formula $$R-CO-N-CH_2X$$
$$|$$
$$R''$$

wherein R is an organic radical free from water-solubilizing groups, R″ is a member of the group consisting of hydrogen and organic radicals free from water-solubilizing groups, while X stands for a member of the group consisting of halogen and the hydroxyl group, and recovering the resulting ether compound.

2. The process of producing novel ether compounds which comprises reacting upon a compound of the general formula $$Z-CONH-CH_2-X$$

wherein Z is an aliphatic radical free from water-solubilizing groups and containing at least 7 carbon atoms and X stands for a member of the group consisting of halogen and hydroxy, with a hydroxyl-bearing compound of the general formula HO—R′, wherein R′ stands for a hydrocarbon radical selected from the group consisting of alkyl, cycloalkyl and aralkyl.

MAX ENGELMANN.
JOSEF PIKL.